US012539551B2

(12) United States Patent
Vogt et al.

(10) Patent No.: US 12,539,551 B2
(45) Date of Patent: Feb. 3, 2026

(54) SAW GUIDE SUPPORT PAD

(71) Applicant: Precision Guide Machinery and Repair Limited, Prince George (CA)

(72) Inventors: Nalynd Vogt, Prince George (CA); Carrick Bergen, Prince George (CA); Nathan Pacholko, Prince George (CA)

(73) Assignee: PRECISION GUIDE MACHINERY AND REPAIR LIMITED, Prince George (CA)

( * ) Notice: Subject to any disclaimer, the term of this patent is extended or adjusted under 35 U.S.C. 154(b) by 0 days.

(21) Appl. No.: 18/075,305

(22) Filed: Dec. 5, 2022

(65) Prior Publication Data

US 2023/0173598 A1 Jun. 8, 2023

Related U.S. Application Data

(60) Provisional application No. 63/285,622, filed on Dec. 3, 2021.

(51) Int. Cl.
  *B23D 59/02* (2006.01)
  *B23D 47/00* (2006.01)
  *B27B 5/34* (2006.01)

(52) U.S. Cl.
  CPC ......... *B23D 59/025* (2013.01); *B23D 47/005* (2013.01); *B27B 5/34* (2013.01)

(58) Field of Classification Search
  CPC . Y10T 83/263; Y10T 83/8878; Y10T 83/888; Y10T 83/8881; Y10T 83/8886; Y10T 83/8887; Y10T 83/8889; B23D 47/005; B23D 59/02; B23D 59/025; B27B 5/34
  USPC .......... 83/169, 821, 823, 824, 827, 828, 829
  See application file for complete search history.

(56) References Cited

U.S. PATENT DOCUMENTS

| 3,674,065 A | 7/1972 | Fairfield, Jr. et al. |
| 4,635,513 A | 1/1987 | McGeehee |
| 4,715,254 A | 12/1987 | DeGan |
| 2003/0140751 A1* | 7/2003 | McGehee ............ B23D 47/005 83/169 |
| 2016/0008897 A1 | 1/2016 | McGehee |
| 2019/0337064 A1 | 11/2019 | Stroud et al. |

FOREIGN PATENT DOCUMENTS

CA 3127129 A1 * 8/2020 ........... B23D 47/005

OTHER PUBLICATIONS

Panah et al., Develop Methods to Reduce Circular Saw Guide Water Usage, May 2016, FPInnovations.

* cited by examiner

*Primary Examiner* — Evan H MacFarlane
(74) *Attorney, Agent, or Firm* — Oyen Wiggs Green & Mutala LLP

(57) ABSTRACT

A support pad for a saw guide includes a first pad face and a second pad face opposite the first pad face. The first pad face includes an inner region and an outer region. The outer region surrounds the inner region. The outer region includes at least two pad openings and a pad channel. The pad openings are adapted to allow lubricant from the saw guide to pass through the support pad and to exit from the outer region. The pad channel extends between at least two of the pad openings. The pad channel provides a path for the lubricant to travel. The second pad face is adapted to be attached to the saw guide.

13 Claims, 8 Drawing Sheets

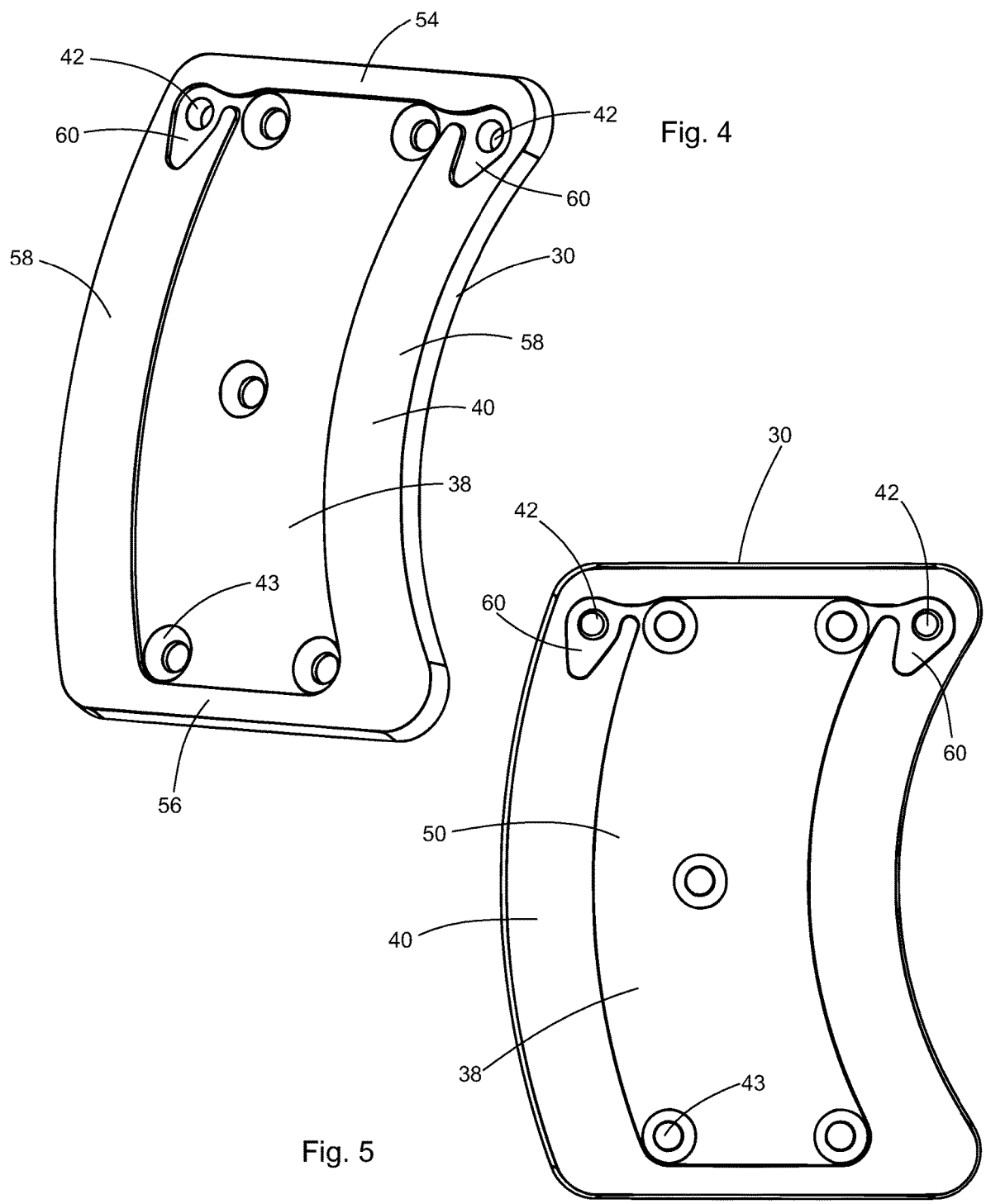

SAW GUIDE SUPPORT PAD

CROSS-REFERENCE TO RELATED APPLICATIONS

This application claims the benefit of U.S. Provisional Patent Application No. 63/285,622 filed Dec. 3, 2021.

FIELD OF THE INVENTION

The present invention relates to gang saws, and in particular, to saw guide support pads in gang saws.

BACKGROUND OF THE INVENTION

In a typical gang saw, a plurality of parallel circular saw blades are mounted on a rotating arbor to form a gang saw assembly. A saw guide assembly is provided for each gang saw assembly. The saw guide assembly comprises a plurality of saw guides attached to a guide post. The saw guides and the saw blades are configured such that each saw blade engages the saw guide assembly in between two adjacent saw guides. The saw blades rotate at high speeds in order to cut logs into individual boards.

During operation, the saw blades may get quite hot. If a saw blade becomes too hot, there may be very adverse consequences to the general state of the equipment (i.e. the saw blades and/or the saw guides may become damaged) and to the quality of the resulting lumber product. In particular, high temperatures for extended periods of time may result in earlier than expected failure of the saw blades and/or the saw guides.

In order to provide cooling and general lubrication to the saw blades, it is typical to provide lubricants to the saw blades and/or the saw guides. Lubricants may include air, oil, water, or a mixture of air, oil and/or water. These lubricants are typically supplied through channels or pathways formed within the saw guides. However, because of the geometry of the individual saw guides and the relative arrangement of the saw guides, there may be an uneven or insufficient supply of lubricant to different portions of the gang saw, thereby reducing the effectiveness of the cooling.

Typically, support pads may be used with saw guides. The support pads may be attached to one or both sides of the saw guides. The support pads comprise apertures for facilitating the flow of lubricant out of the saw guides in order to cool the saw blades.

It is therefore one objective of the invention to provide an improved support pad for saw guides.

SUMMARY OF THE INVENTION

In accordance with one embodiment of the invention, a support pad for a saw guide comprises inner and outer regions. At least two pad openings are provided in the outer region that are adapted to allow for lubricant to flow from the saw guide. The lubricant is able to flow across the outer region and into the inner region. A pad channel is also provided that extends between the pad openings. In one embodiment, the pad channel comprises a channel opening such that a path between the pad openings and the inner region is provided. In another embodiment, the pad channel does not have a channel opening such that there is no path between the pad openings and the inner region.

In one embodiment, a support pad for a saw guide comprises a first pad face and a second pad face opposite the first pad face. The first pad face comprises an inner region and an outer region. The outer region surrounds, at least in part, the inner region. The outer region comprises at least two pad openings, at least two cutout regions, and a pad channel. The pad openings are adapted to allow lubricant from the saw guide to pass through the support pad and to exit from the outer region. Each of the cutout regions surrounds, at least in part, one of the pad openings. The pad channel provide a path for the lubricant to travel. The second pad face is adapted to be attached to the saw guide.

In another embodiment, the pad channel is substantially straight.

In yet another embodiment, the pad channel comprises one or more channel openings, with the channel openings connecting the pad channel to the inner region.

In still yet another embodiment, the one or more channel openings comprises one channel opening.

In a further embodiment, the channel opening is located approximately at a midpoint between the cutout regions.

In still a further embodiment, the outer region is of a greater thickness than the inner region.

In still yet a further embodiment, the cutout regions have a first depth and the pad channel has a second depth, with the first depth substantially similar to the second depth.

In still another embodiment, the pad channel has a second depth and the inner region has a third depth, with the second depth substantially similar to the third depth.

In still yet another embodiment, the cutout regions are teardrop-shaped.

In yet a further embodiment, the outer region comprises a first outer region, a second outer region, and two side outer regions extending between the first and second outer regions. The pad channel is located within the first outer region.

In another embodiment, a support pad for a saw guide comprises a first pad face and a second pad face opposite the first pad face. The first pad face comprises an inner region and an outer region. The outer region surrounds, at least in part, the inner region. The outer region comprises at least two pad openings and a pad channel. The pad openings are adapted to allow lubricant from the saw guide to pass through the support pad and to exit from the outer region. The pad channel extends between at least two of the pad openings. The pad channel provides a path for the lubricant to travel. The second pad face is adapted to be attached to the saw guide.

In still another embodiment, the support pad is made from a Babbitt material.

The foregoing was intended as a summary only and of only some of the aspects of the invention. It was not intended to define the limits or requirements of the invention. Other aspects of the invention will be appreciated by reference to the detailed description of the preferred embodiments.

BRIEF DESCRIPTION OF THE DRAWINGS

The invention will be described by reference to the detailed description of the embodiments and to the drawings thereof in which:

FIG. 4 depicts a top perspective view of a support pad for a saw guide;

FIG. 5 depicts the top view of the support pad of FIG. 4;

DETAILED DESCRIPTION OF THE INVENTION

Figure 1:
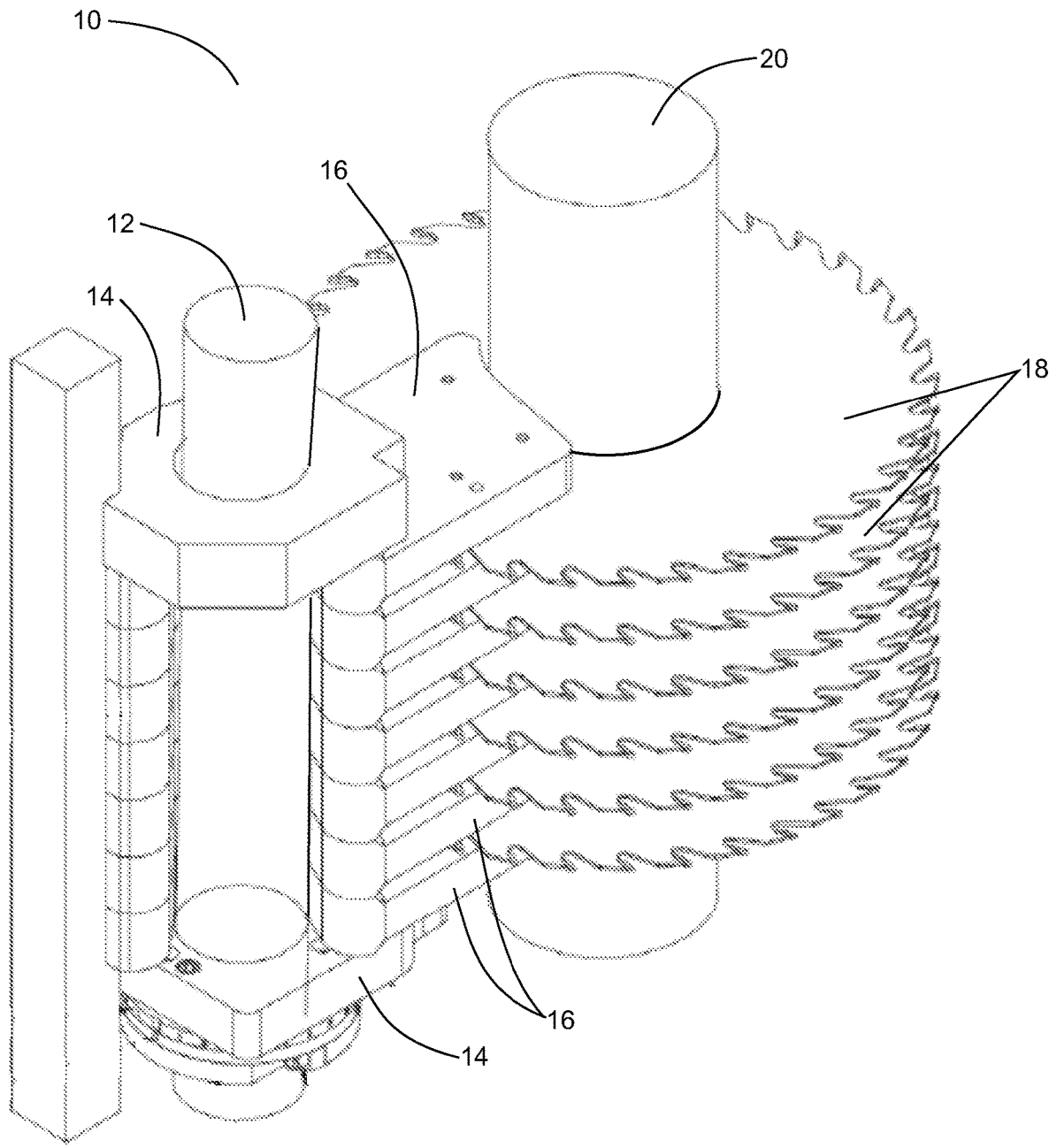
FIG. 1 depicts a saw arbor guide assembly.

Referring to FIG. 1, a saw arbor guide assembly 10 comprises a guide post 12 and a plurality of saw guides 16. One or more guide manifolds 14 may be mounted on the guide post 12. The guide post 12 may be substantially cylindrical in shape, but other shapes and configurations for the guide post 12 are also possible. The plurality of saw guides 16 are arranged, generally in a stacked configuration, on the guide post 12, as shown in FIG. 1. The location and spacing of the saw guides 16 are such so as to allow them to interact with one or more saw blades 18 that are attached to a rotating arbor 20 during cutting operation. In particular, the saw guides 16 are preferably arranged such that one of the saw blades 18 travels in between two adjacent ones of the saw guides 16 during operation.

The saw arbor guide assembly 10 depicted in FIG. 1 is a vertical single arbor (VSA) configuration (with a single set of saw guides 16 and a single set of saw blades 18 arranged vertically). It is understood that other configurations are also possible, such as a vertical double arbor (VDA) configuration (with two sets of saw guides 16 and two sets of saw blades 18 arranged vertically), a horizontal single arbor (HSA) configuration (with a single set of saw guides 16 and a single set of saw blades 18 arranged horizontally), a horizontal double arbor (HDA) configuration (with two sets of saw guides 16 and two sets of saw blades 18 arranged horizontally), and a quad configuration (with four sets of saw guides 16 and four sets of saw blades 18 arranged horizontally or in some other configuration).

Figure 2:
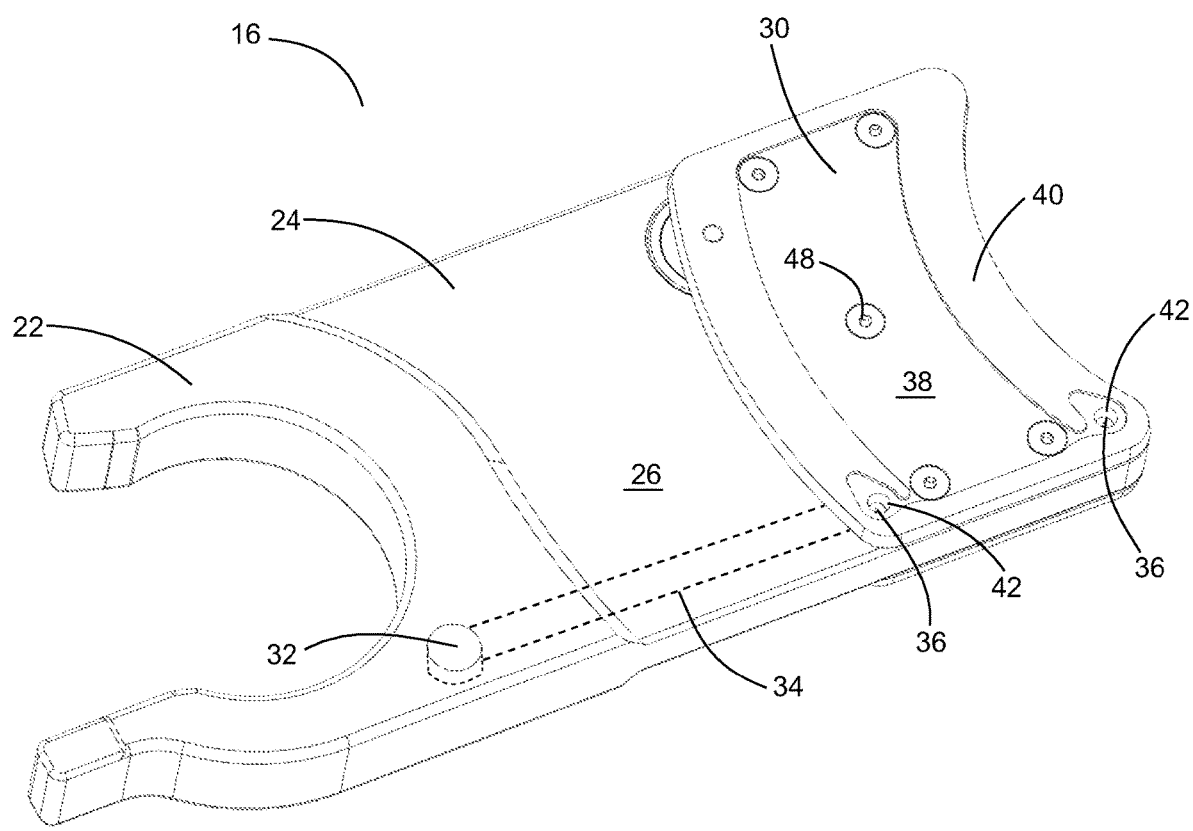
FIG. 2 is a top perspective view of a saw guide.
Figure 3:
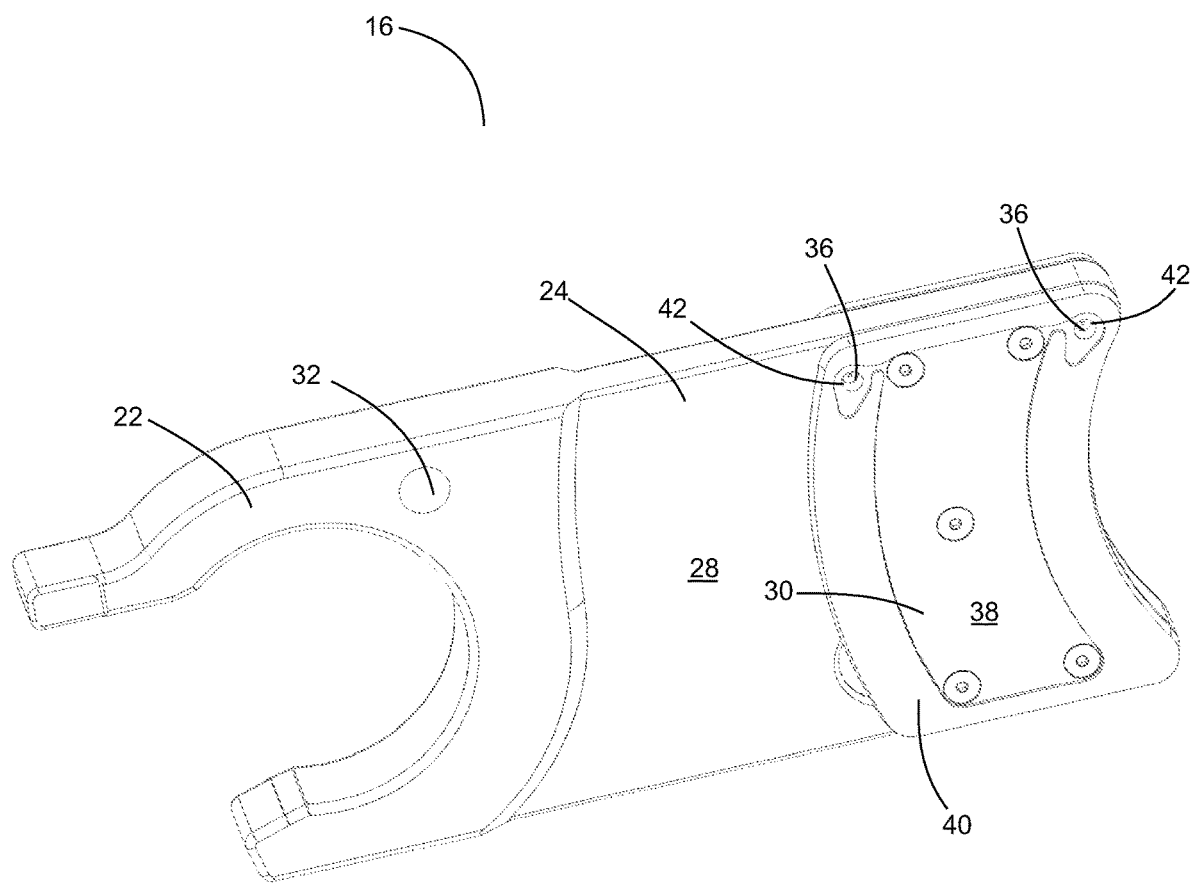
FIG. 3 is a bottom perspective view of the saw guide of FIG. 2.

FIGS. 2 and 3 depict one of the saw guides 16 of the saw arbor guide assembly 10. The saw guide 16 comprises a head 22 and a body 24. The head 22 is attached to the body 24. Preferably, the head 22 and the body 24 are integrally attached. The head 22 is adapted to attach to the guide post 12, while the body 24 is adapted to, in conjunction with adjacent ones of the saw guides 16, interact with one or more of the saw blades 18. In other words, the saw blades 18 are configured to rotate or spin between adjacent ones of the saw guides 16. The body 24 comprises opposing first and second faces 26, 28.

Preferably, one or both of the first and second faces 26, 28 are adapted to accommodate a generally flat support pad 30 for interacting with the saw blades 18. When interacting with the saw blades 18, the support pads 30 preferably do not come into physical contact with the saw blades 18; however, the support pads 30 assist in providing cooling and/or lubrication to the saw blades 18 when the saw blades 18 are rotating (i.e. during cutting operation), as described later. In one embodiment, the support pad 30 may be made substantially from Babbitt material; however, it is understood that the support pad 30 may also be made from other materials suitable as a bearing/wear surface. For ease of illustration, FIGS. 2 and 3 depict only a single one of the saw guides 16, but it is understood that the saw blade 18 may be located (and rotate) in between two of the saw guides 16 (for example, as shown in FIG. 1).

The head 22 comprises one or more intake channels 32 for supplying lubricant to the saw guide 16. Preferably, the intake channels 32 extend substantially parallel to the guide post 12 and extend for an entire depth of the saw guide 16. In this manner, when the saw guides 16 are stacked on top of each other (and attached to the guide post 12), the intake channels 32 for each of the saw guides 16 are preferably aligned with one another and form a common through-passage for the lubricant to flow. This allows the lubricant to flow through each of the saw guides 16.

Furthermore, one or more passages 34 (shown in dotted lines) are formed within the saw guide 16 and extend from the intake channels 32. The passages 34 extends through the head 22 and into the body 24. One or more lubricant openings 36 are formed on one or both of the first face 26 or the second face 28.

The passages 34 connect the intake channels 32 to the lubricant openings 36, thereby allowing the lubricant to flow from the intake channels 32 to the body openings 36. The passages 34 may need to split or branch into multiple ones of the passages 34 in order to ensure that each of the lubricant openings 36 are connected to the intake channels 32.

FIGS. 4 and 5 depict an embodiment of the support pad 30. The support pad 30 comprises first and second pad faces 50, 52 and may be attached to the body 24 using mechanical fasteners, such as bolts 48 or through some other suitable method. When the support pad 30 is attached to the body 24, the second pad face 52 is in contact with the body 24. The first pad face 50 may comprise an inner region 38 generally surrounded by an outer region 40. Preferably, the inner region 38 is of a lesser thickness than the outer region 40, such that the inner region 38 generally forms a depression on the first pad face 50 with respect to the outer region 40. The support pads 30 may also comprise one or more mounting openings 43 adapted to receive the bolts 48 therethrough for securing the support pad 30 to the body 24. The mounting openings 43 are preferably located in the inner region 38 but may also be located in the outer region 40.

When the support pad 30 is attached to the body 24, the lubricant openings 36 are preferably located under the outer region 40 of the support pad 30. Furthermore, the outer region 40 preferably comprises one or more pad openings 42 corresponding in location above the lubricant openings 36. The pad openings 42 extend for an entire depth of the support pad 30 and allow lubricant to flow from the lubricant openings 36, through the support pad 30 and out from the first pad face 50. On the first pad face 50, each of the pad openings 42 may open to a teardrop-shaped cutout region 60 that surrounds, at least in part, the pad opening 42. The cutout region 60 provides a depression within the outer region 40 and allows lubricant exiting from the pad openings 42 to pool or collect around the pad openings 42, at least temporarily. Preferably, the cutout regions 60 are connected to the inner region 38, such that lubricant is able to flow from the cutout regions 60 to the inner region 38.

Figure 6:
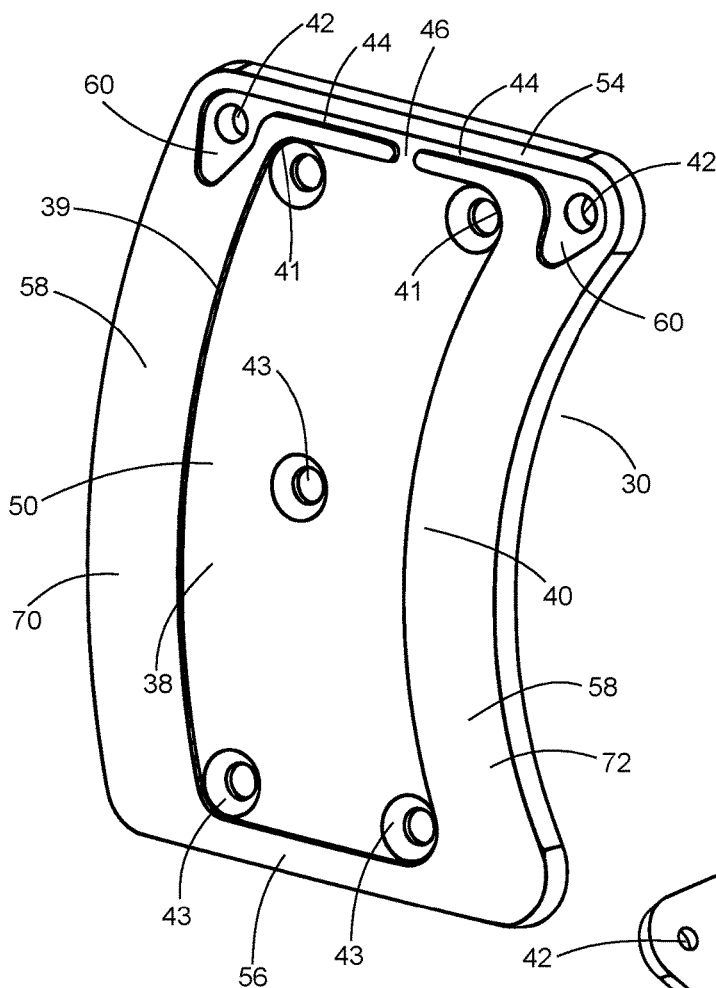
FIG. 6 is a top perspective view of a support pad for a saw guide in accordance with one embodiment of the invention.
Figure 7:
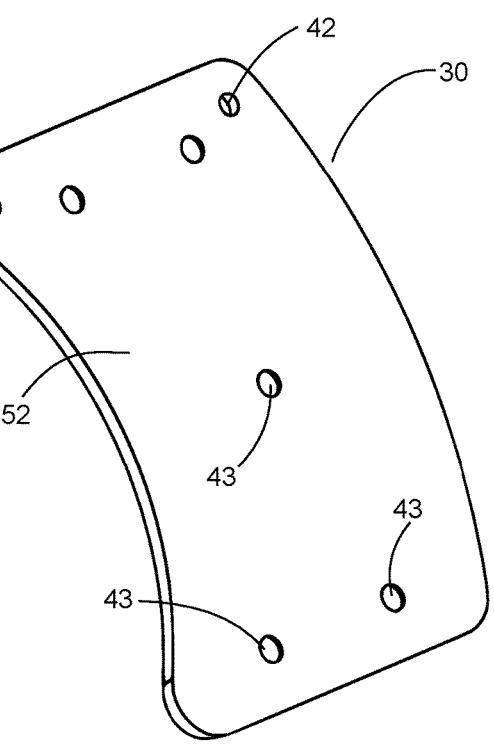
FIG. 7 is a bottom perspective view of the support pad of FIG. 6.
Figure 8:
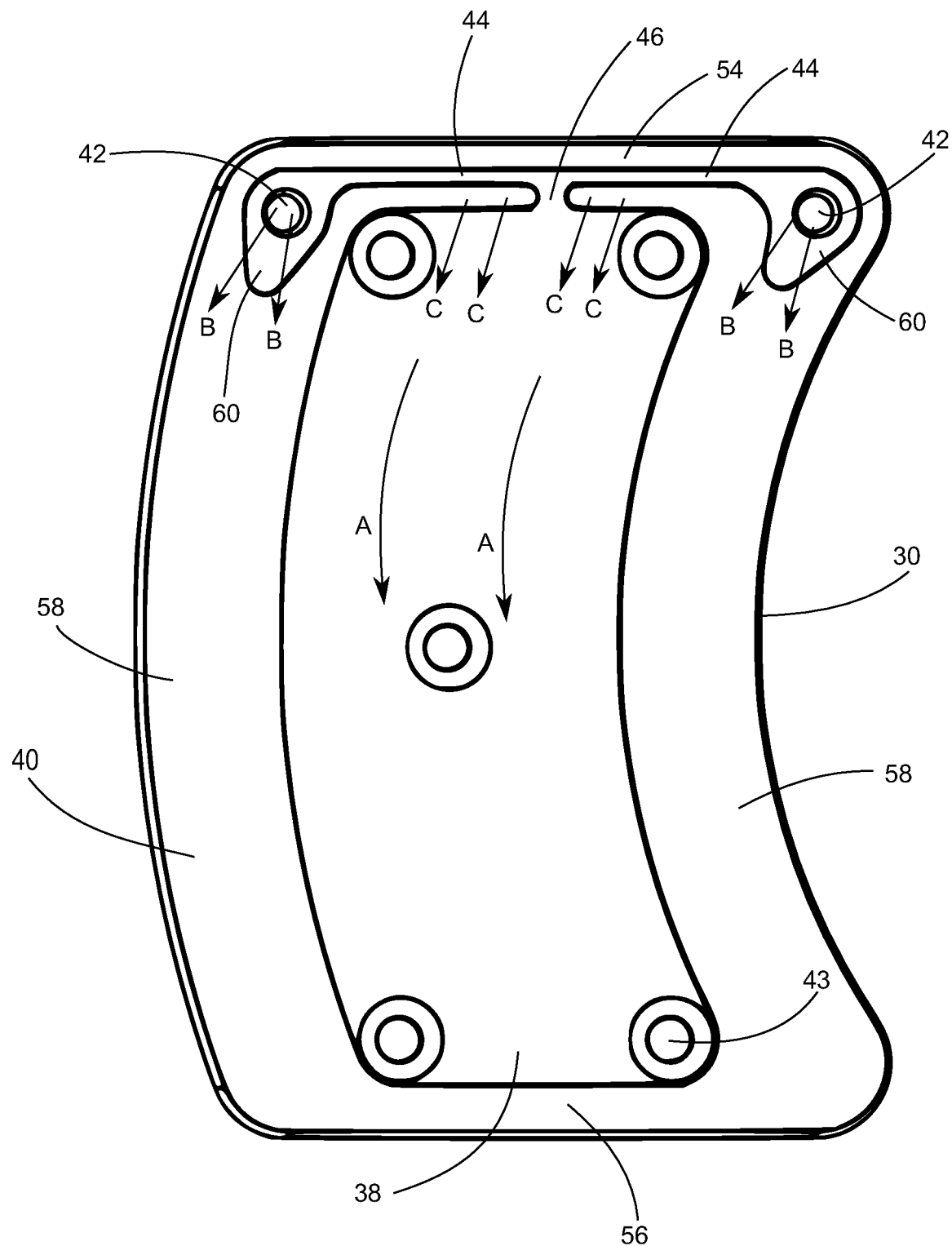
FIG. 8 is a top view of the support pad of FIG. 6.

FIGS. 6 to 8 depict one of the support pads 30 in accordance with one embodiment of the invention. The outer region 40 extends along at least a portion of a perimeter of the first pad face 50 and preferably comprises a first outer region portion 54 and a second outer region portion 56. Preferably, the first outer region portion 54 and the second outer region portion 56 are substantially parallel to each other. However, it is understood that in some configurations, the first outer region portion 54 and the second outer region portion 56 are not necessarily parallel to each other. The outer region 40 further comprises a pair of side outer regions 58 (for example, first and second side regions 70, 72) that extend between the first outer region portion 54 and the second outer region portion 56. The outer region 40 preferably comprises at least two of the pad openings 42. In the embodiment shown in FIGS. 6 to 8, two of the pad openings 42 are provided, with the pad openings 42 preferably located proximate to where the first outer region portion 54 meet with the side outer regions 58. However, it is understood that additional ones of the pad openings 42 may also be provided, such as along the side outer regions 58, particularly when the side outer regions 58 are relatively long. Referring to FIG. 6, an outer perimeter of the inner region 38 may be bounded, at least in part, by a raised wall 39 extending along an inner perimeter of the outer region 40. The raised wall 39 may define at least two corners 41 along the inner perimeter of the outer region 40, with the raised wall 39 forming a continuous boundary along the at least two corners 41.

Cutout regions 60 preferably surround, at least in part, each of the pad openings 42. The cutout regions 60 are preferably teardrop-shaped, with the narrow portion of the cutout regions 60 extending into the side outer regions 58, as shown in FIG. 6.

Referring to FIG. 6, the first outer region portion 54 comprises a pad channel 44 extending between the cutout regions 60. The pad channel 44 comprises a channel opening 46 located along a length of the pad channel 44. The channel opening 46 provides a path between the pad channel 44 and the inner region 38. Preferably, the pad channel 44 is substantially straight, although other orientations and configurations for the pad channel 44 are also possible. In the embodiment shown in FIG. 6, the channel opening 46 is located approximately at a midpoint of the pad channel 44 between the cutout regions 60; however, it is understood that the channel opening 46 may be located at other locations along the length of the pad channel 44. Furthermore, the pad channel 44 may comprise more than one channel opening 46 along the length of the pad channel 44, such that there would be multiple paths between the pad channel 44 and the inner region 38.

Preferably, a thickness of the support pad 30 proximate to the cutout regions 60 is substantially similar to a thickness of the inner region 38. Also preferably, a thickness of the support pad 30 within the pad channel 44 is substantially similar to a thickness of the inner region 38. Therefore, preferably, the cutout regions 60, the pad channel 44, and the inner regions 38 all have a similar depth.

The support pads 30 may also comprise one or more of the mounting openings 43 for receiving bolts 48 therethrough for securing the support pad 30 to the body 24.

Referring to FIG. 8, when the support pad 30 is used in the saw arbor guide assembly 10, one of the saw blades 18 will rotate just above the support pad 30 (in direction A) during cutting operation. The saw blade 18 preferably does not come into physical contact with the support pad 30, but instead, the saw blade 18 will be separated from the support pad 30 by a thin layer of lubricant that is supplied through the pad openings 42. Because of the location of the pad openings 42 and the presence of the cutout regions 60, the pad openings 42 allow lubricant to collect (at least initially) at the side outer regions 58 proximate to the pad openings 42. The rotation of the saw blade 18 in direction A will draw lubricant over the side outer regions 58 in direction B, providing lubrication and cooling to the saw blade 18.

The outer region 40 (comprising the first and second outer region portions 54, 56 and the side outer regions 58) allows a flow of lubricant across the first pad face 50, which may help to pressurize the inner region 38 and prevent foreign debris from entering the inner region 38. The lubricant may comprise one or more of air, water, or oil. For example, where the lubricant comprises air, the movement of the air may help to pressurize the inner region 38. Similarly, for example, where the lubricant does not comprise air, the volume of the lubricant may help to pressurize the inner region 38.

As the lubricant flows along and over the side outer regions 58, some of the lubricant typically will escape from the side outer regions 58 and make its way to the second outer region portion 56, thereby providing sufficient lubricant to the surface of the second outer region portion 56. In addition, some lubricant will also escape from the side outer regions 58 into the inner region 38.

However, because of the location of the pad openings 42 (in or proximate to the first outer region portion 54), the first outer region portion 54 may receive inadequate lubrication (or even no lubrication at all), as the lubricant is mostly drawn along the side outer regions 58. This may result in heat being generated (including, for example, from friction) when the support pad 30 interacts with the saw blade 18.

The provision of the pad channel 44 in the first outer region portion 54 allows for the supply of adequate lubrication to the first outer region portion 54, as described below.

Initially, lubricant moves through the passages 34 and the lubricant openings 36 and eventually escapes through the pad openings 42 onto the cutout regions 60. The lubricant then moves from the cutout regions 60 into the pad channel 44, and through the channel opening 46, into the inner region 38. The movement of the lubricant may be caused by the flow and volume of the lubricant passing through the saw guide 16. Also, the lubricant may be drawn out of the pad openings 42 into the cutout regions 60 and into the pad channel 44 and eventually into the inner region 38 by, for example, pressure changes proximate to the channel opening 46 caused by the movement of the saw blade 18. The lubricant will lubricate and cool the first outer region portion 54. The lubricant will be also be drawn over and across the first outer region portion 54 in direction C by the rotation of the saw blade 18 (in direction A). The lubricant will move into and across the inner region 38.

The pad channel 44 allows for the cooling and lubrication of the first outer region portion 54. In addition, where the lubricant comprises air, the movement of the air may help in maintaining air pressure within the inner region 38. This helps to prevent foreign debris from collecting in the inner region 38. Foreign debris will create unwanted friction by rubbing against the saw blade 18 and/or by blocking lubrication by plugging the pad openings 42.

Figure 9:
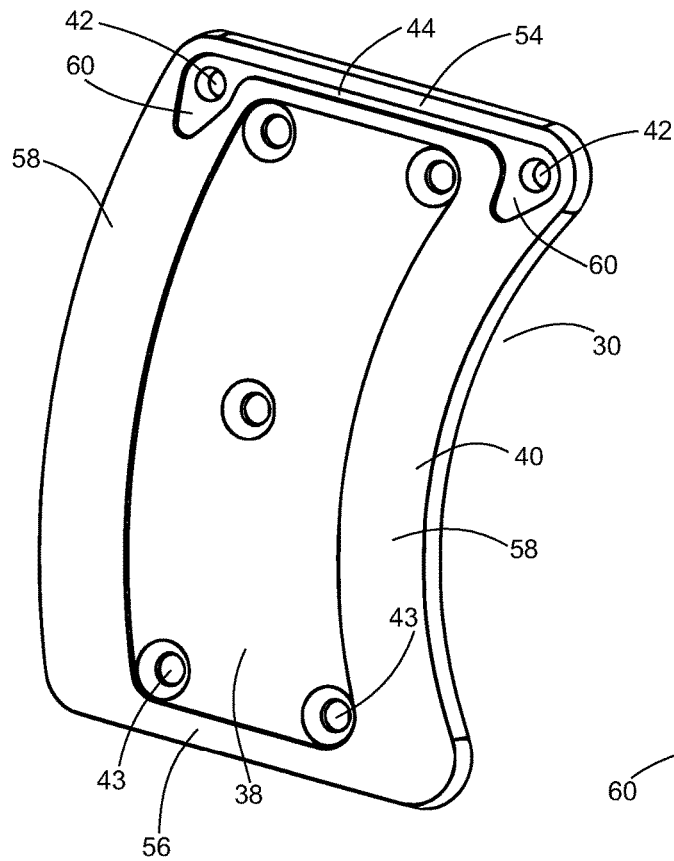
FIG. 9 is a top perspective view of a support pad in accordance with another embodiment of the invention.
Figure 10:
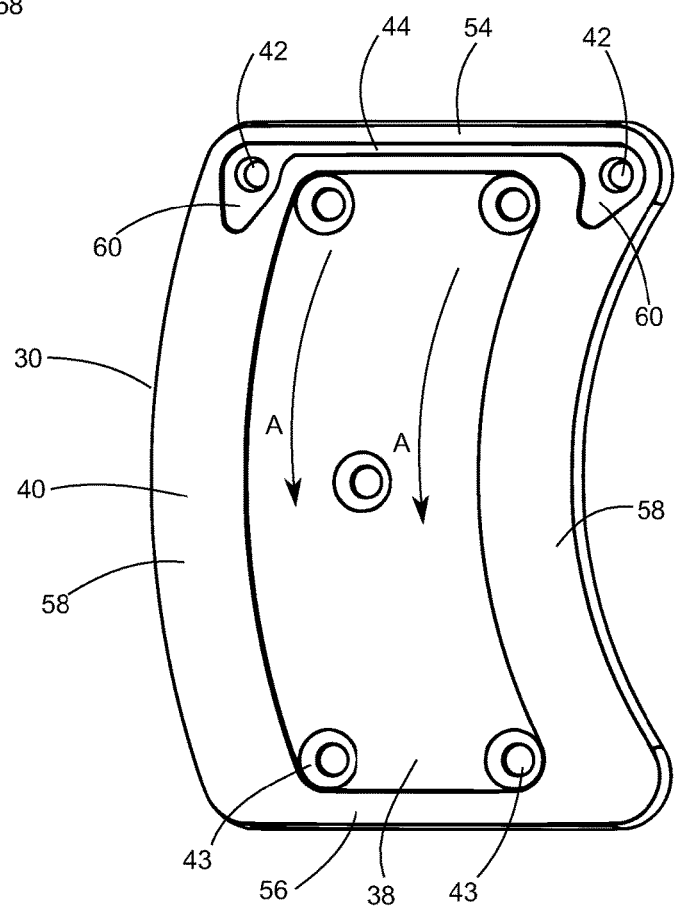
FIG. 10 is a top view of the support pad of FIG. 9.

FIGS. 9 to 10 depict another embodiment of the support pad 30. In this embodiment, the support pad 30 also comprises two of the pad openings 42 with teardrop-shaped cutout regions 60 that are generally teardrop-shaped and surround, at least in part, the pad openings 42. A pad channel 44 extends between the cutout regions 60. However, unlike in the embodiment of FIGS. 6 to 8, the channel opening 46 is omitted. In other words, there is no direct path between the pad openings 42 and the inner region 38.

However, lubricant is still able to enter into the inner region 38, because in part of the rotation of the saw blade 18 (in direction A, as shown in FIG. 10). The rotation of the saw blade 18 will tend to draw lubricant out of the pad channel 44 and into the inner region 38. As with the previous embodiment, the saw blade 18 preferably does not come into contact with the support pad 30 but is separated from the support pad 30 from a thin layer of lubricant (supplied through the pad openings 42).

As with the previous embodiment, the air pressure in the pad channel 44 and the pad openings 42 will help to prevent foreign debris from entering the inner region 38.

FIGS. 9 to 10 depict the first pad face 50 of this embodiment. The second pad face 52 is similar to the previous embodiment.

Figure 11:
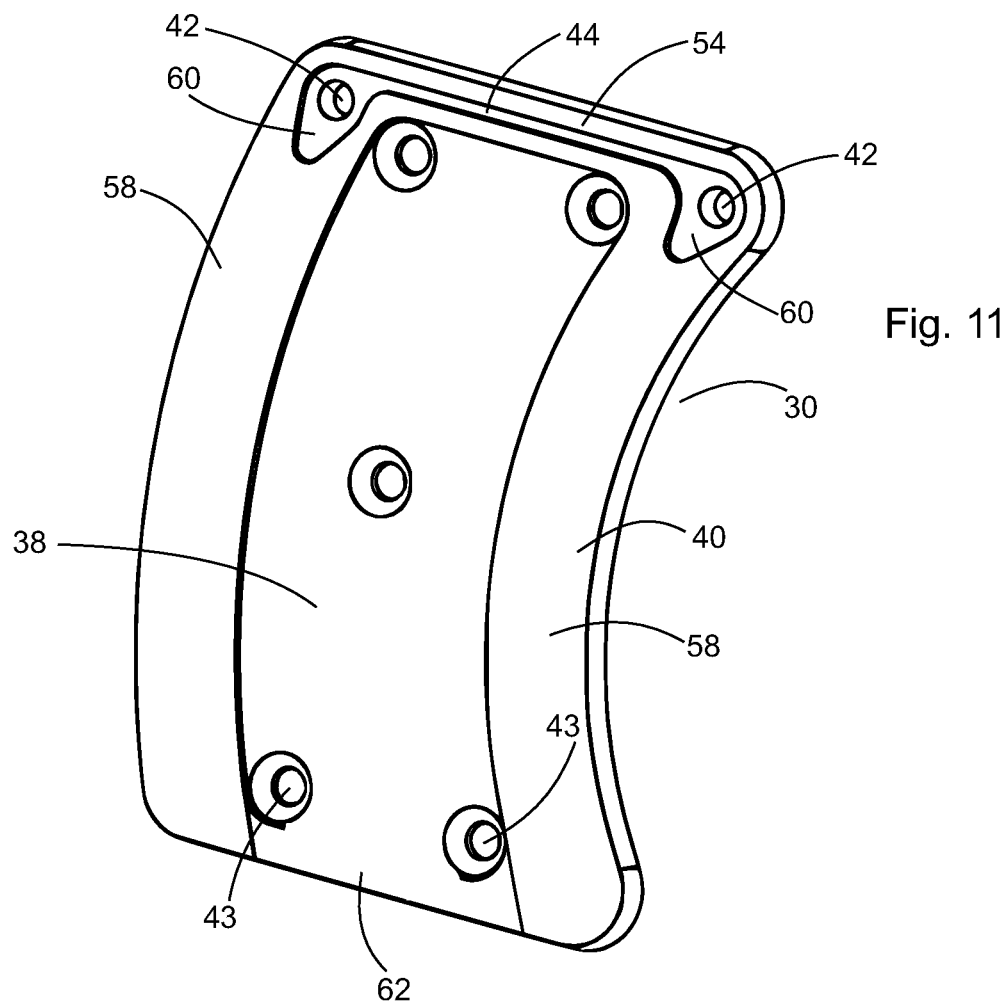
FIG. 11 is a top perspective view of a support pad in accordance with still another embodiment of the invention.

FIG. 11 depict still another embodiment of the support pad 30. This embodiment is similar to the embodiment shown in FIGS. 9 and 10, except that the outer region 40 extends only along a portion of the perimeter of the inner region 38. For example, the outer region 40 may comprise only the first outer region portion 54 and the side outer regions 58 (i.e. the second outer region portion 56 is omitted). The side outer regions 58 may define, at least in part, an inner region opening 62. In this embodiment, any foreign debris that makes its way into the inner region 38 would be able to escape through the inner region opening 62 between the side outer regions 58.

It will be appreciated by those skilled in the art that the preferred embodiments have been described in some detail but that certain modifications may be practiced without departing from the principles of the invention.

The invention claimed is:

1. A support pad for a saw guide, the support pad comprising:
   a first pad face comprising:
      an inner region; and
      an outer region surrounding, at least in part, the inner region, the outer region comprising:
         a first outer region portion;
         first and second side regions, each of the first and second side regions extending from the first outer region portion;
         two pad openings extending through the support pad, the two pad openings adapted to allow lubricant from the saw guide to pass through the support pad;
         two cutout regions, wherein each of the two cutout regions surrounds, at least in part, one of the two pad openings; and
         a pad channel extending within the first outer region portion and between the two cutout regions, the pad channel providing a path for the lubricant to travel within the first outer region portion between the cutout regions; and
   a second pad face opposite the first pad face, the second pad face adapted to engage the saw guide;
   wherein the inner region is recessed with respect to the outer region, wherein an outer perimeter of the inner region is bounded, at least in part, by a raised wall extending along an inner perimeter of the outer region, the raised wall defining at least two corners, wherein a first one of the at least two corners extends between the first outer region portion and the first side region, wherein a second one of the at least two corners extends between the first outer region portion and the second side region, and wherein the raised wall forms a continuous boundary along both of the first and second ones of the at least two corners; and wherein the pad channel comprises a channel opening, the channel opening connecting the pad channel to the inner region through the raised wall.

2. The support pad of claim 1, wherein the pad channel is straight.

3. The support pad of claim 1, wherein the channel opening is the sole channel opening connecting the pad channel to the inner region through the raised wall.

4. The support pad of claim 3, wherein the channel opening is located approximately at a midpoint between the two cutout regions.

5. The support pad of claim 1, wherein the two cutout regions have a first depth and the pad channel has a second depth, wherein the first depth is the same as the second depth.

6. The support pad of claim 1, wherein the pad channel has a second depth and the inner region has a third depth, wherein the second depth is the same as the third depth.

7. The support pad of claim 1, wherein each of the two cutout regions is teardrop-shaped.

8. The support pad of claim 1, wherein the outer region further comprises a second outer region portion spaced apart from the first outer region portion and connected to the first and second side regions.

9. A support pad for a saw guide, the support pad comprising:
   a first pad face comprising:
      an inner region; and
      an outer region surrounding, at least in part, the inner region, the outer region comprising:
         a first outer region portion;
         first and second side regions, each of the first and second side regions extending from the first outer region portion;
         two pad openings extending through the support pad, the two pad openings adapted to allow lubricant from the saw guide to pass through the support pad; and
         a pad channel extending within the first outer region portion and between the two pad openings, the pad channel providing a path for the lubricant to travel within the first outer region portion between the two pad openings; and
   a second pad face opposite the first pad face, the second pad face adapted to engage the saw guide;
   wherein the inner region is recessed with respect to the outer region, wherein an outer perimeter of the inner region is bounded, at least in part, by a raised wall extending along an inner perimeter of the outer region, the raised wall defining at least two corners, wherein a first one of the at least two corners extends between the first outer region portion and first side region, wherein a second one of the at least two corners extends between the first outer region portion and the second side region, wherein the raised wall forms a continuous boundary along both of the first and second ones of the at least two corners, and wherein the pad channel comprises a channel opening, the channel opening connecting the pad channel to the inner region through the raised wall.

10. The support pad of claim 9, wherein the pad channel is straight.

11. The support pad of claim 9, wherein the channel opening is the sole channel opening connecting the pad channel to the inner region through the raised wall.

12. The support pad of claim 11, wherein the channel opening is located approximately at a midpoint between the two pad openings.

13. The support pad of claim 9, wherein the support pad is made from a Babbitt material.

* * * * *